United States Patent
Lee et al.

(10) Patent No.: US 12,095,574 B2
(45) Date of Patent: Sep. 17, 2024

(54) EAVESDROPPER DETECTION APPARATUS AND OPERATING METHOD THEREOF

(71) Applicant: KOREA INSTITUTE OF SCIENCE & TECHNOLOGY INFORMATION, Daejeon (KR)

(72) Inventors: Chan Kyun Lee, Daejeon (KR); Il Kwon Sohn, Daejeon (KR); Eun Joo Lee, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 267 days.

(21) Appl. No.: 17/394,834

(22) Filed: Aug. 5, 2021

(65) Prior Publication Data

US 2022/0224458 A1 Jul. 14, 2022

(30) Foreign Application Priority Data

Jan. 8, 2021 (KR) .................. 10-2021-0002832

(51) Int. Cl.
 *H04L 1/00* (2006.01)
 *H04L 1/20* (2006.01)
 *H04L 9/08* (2006.01)

(52) U.S. Cl.
 CPC ............ *H04L 1/203* (2013.01); *H04L 1/0041* (2013.01); *H04L 1/0045* (2013.01); *H04L 9/0855* (2013.01)

(58) Field of Classification Search
 None
 See application file for complete search history.

(56) References Cited

U.S. PATENT DOCUMENTS

| | | | |
|---|---|---|---|
| 9,306,739 B1* | 4/2016 | Troupe ................. | H04L 9/0858 |
| 2006/0056630 A1* | 3/2006 | Zimmer ................ | G06N 10/00 |
| | | | 380/256 |
| 2013/0016835 A1* | 1/2013 | Zbinden ............... | H04L 9/0852 |
| | | | 380/255 |
| 2013/0251145 A1* | 9/2013 | Lowans ............... | H04L 9/0891 |
| | | | 380/44 |
| 2014/0016779 A1* | 1/2014 | Lirakis .................. | G06N 10/00 |
| | | | 380/256 |
| 2016/0197723 A1* | 7/2016 | Takahashi ............ | H04L 9/0855 |
| | | | 380/255 |
| 2020/0118026 A1* | 4/2020 | Ashrafi ................. | G06N 10/00 |
| 2021/0133614 A1* | 5/2021 | Ashrafi ................. | G06N 10/00 |
| 2021/0152347 A1* | 5/2021 | Cambou ......... | H04B 10/07957 |
| 2022/0114471 A1* | 4/2022 | Vacon ................... | G06N 10/70 |
| 2022/0329417 A1* | 10/2022 | Farinholt ............. | H04L 9/0858 |

FOREIGN PATENT DOCUMENTS

| | | |
|---|---|---|
| JP | 2015032862 A | 2/2015 |
| KR | 10-2017-0125659 A | 11/2017 |
| KR | 10-2019-0071659 A | 6/2019 |
| KR | 10-2020-0034464 A | 3/2020 |

OTHER PUBLICATIONS

Li, J. et al. "One Step Quantum Key Distribution Based on EPR Entanglement." Scientific Reports, vol. 6, Jun. 2016, pp. 1-10.

* cited by examiner

*Primary Examiner* — Mujtaba M Chaudry
(74) *Attorney, Agent, or Firm* — WTA Patents

(57) ABSTRACT

The present disclosure relates to an eavesdropper detection apparatus and an operating method thereof, capable of effectively detecting an eavesdropper existing between a transmitter and a receiver in bit transmission by a quantum key distribution scheme.

10 Claims, 6 Drawing Sheets

| | | BIT GROUP 1 | | BIT GROUP 2 | | BIT GROUP 3 | | BIT GROUP 4 | |
|---|---|---|---|---|---|---|---|---|---|
| TRANSMITTER | POLARIZATION BASIS | ✛ | | ✛ | | ✛ | | ✛ | |
| | TRANSMISSION BIT | 1 | 0 | 1 | 0 | 1 | 0 | 1 | 0 |
| | TRANSMISSION POLARIZATION SIGNAL | ↔ | ↕ | ↔ | ↕ | ↔ | ↕ | ↔ | ↕ |
| EAVESDROPPER | POLARIZATION BASIS | ✛ | | ✛ | | ✖ | | ✖ | |
| | RECEPTION BIT | 1 | 0 | 1 | 0 | 1 | 0 | 1 | 0 |
| | RECEPTION POLARIZATION SIGNAL | ↔ | ↕ | ↔ | ↕ | ↗ | ↖ | ↗ | ↖ |
| RECEIVER | POLARIZATION BASIS | ✛ | | ✖ | | ✛ | | ✖ | |
| | RECEPTION BIT | 1 | 0 | 1 | 0 | 1 | 0 | 1 | 0 |
| | RECEPTION POLARIZATION SIGNAL | ↔ | ↕ | ↗ | ↖ | ↔ | ↕ | ↗ | ↖ |

EAVESDROPPER DETECTION APPARATUS AND OPERATING METHOD THEREOF

CROSS-REFERENCE TO RELATED APPLICATION

This application claims priority to Republic of Korea patent application No. 10-2021-0002832, filed on Jan. 8, 2021, which is incorporated by reference herein in its entirety.

TECHNICAL FIELD

The present disclosure relates to a method for effectively detecting an eavesdropper existing between a transmitter and a receiver in bit transmission in relation to a quantum key distribution scheme.

BACKGROUND

A quantum key distribution scheme is a cryptographic system using quantum physical properties, and is a key technology for next-generation network security. In particular, the BB84 quantum cryptography protocol has come into the limelight, because the BB84 quantum cryptography protocol provides a probabilistic basis for determining the existence or nonexistence of an eavesdropper through a simple structure and calculation in quantum key distribution.

In the existing BB84 protocol, after a photon is transmitted, a quantum error rate in bit units between a transmitter and a receiver is calculated, and when the quantum error rate exceeds a threshold value, it is determined that there is an eavesdropper.

However, in the existing BB84 quantum cryptography protocol, it is difficult to set the threshold value of a quantum bit error rate (QBER) for determining an eavesdropper due to instability of a quantum channel or the like, and misdetection (where it is determined that there is an eavesdropper when there is no eavesdropper) and non-detection (where it is determined that there is no eavesdropper when there is an eavesdropper) of an eavesdropper may occur a plurality of times.

Accordingly, in the existing BB84 protocol, a method of reducing the threshold value of an error rate in bit units may be used in order to reduce non-detection of an eavesdropper. However, this method dramatically increases the misdetection rate of an eavesdropper, and thus application thereof is limited.

SUMMARY

The present disclosure has been made in order to address the above-mentioned shortcomings of the related art, and is directed to accurately and effectively detecting an eavesdropper existing between a transmitter and a receiver in bit transmission by a quantum key distribution scheme.

In view of the foregoing, an eavesdropper detection apparatus according to an embodiment of the present disclosure includes: a bit error statistics unit configured to statistically compile a quantum error rate in bit units between a transmitter and a receiver with respect to a photon for each bit in two or more bit groups into which a bit string to be transmitted is grouped by the same number of bits; a group error statistics unit configured to statistically compile a quantum error rate in group units between the transmitter and the receiver with respect to the photon for each bit in the two or more bit groups; and an eavesdropper determination unit configured to determine whether an eavesdropper exists between the transmitter and the receiver, based on at least one of the quantum error rate in bit units or the quantum error rate in group units.

Specifically, for the two or more bit groups, a polarization basis configured for each bit group may be equally maintained during a transmission time, which is a time for transmitting all photons for each bit in each bit group.

Specifically, the transmission time may be a switching time required for the eavesdropper to change the polarization basis.

Specifically, at least one of the bit error statistics unit or the group error statistics unit may be configured to statistically compile a quantum error rate with respect to a photon for each bit in a bit group for which a polarization basis of the transmitter and a polarization basis of the receiver match among the two or more bit groups.

Specifically, the bit error statistics unit may be configured to statistically compile the quantum error rate in bit units according to a ratio of a number of bits of which bit values do not match between the transmitter and the receiver to a number of bits transmitted between the transmitter and the receiver.

Specifically, the group error statistics unit may be configured to statistically compile, for each bit group, the quantum error rate in group units according to a ratio of a number of bits of which bit values do not match between the transmitter and the receiver to a number of bits transmitted between the transmitter and the receiver.

Specifically, the eavesdropper determination unit may be configured to determine whether the eavesdropper exists, based on the quantum error rate in bit units, and to verify at least one of misdetection of the eavesdropper or non-detection of the eavesdropper, based on the quantum error rate in group units, with respect to a result of determining whether the eavesdropper exists.

Specifically, when an importance of reducing the misdetection of the eavesdropper is a set value or greater, the eavesdropper determination unit may be configured to finally determine that the eavesdropper exists only in a case where a first determination condition that the quantum error rate in bit units is a first threshold value or greater, and a second determination condition that a ratio of the quantum error rate in group units being a second threshold value or greater is a third threshold value or greater and a ratio of the quantum error rate in group units being a fourth threshold value or less is a fifth threshold value or greater, are both satisfied.

Specifically, when an importance of reducing the non-detection of the eavesdropper is a set value or greater, the eavesdropper determination unit may be configured to finally determine that the eavesdropper exists only in a case where at least one of a first determination condition that the quantum error rate in bit units is a first threshold value or greater or a second determination condition that a ratio of the quantum error rate in group units being a second threshold value or greater is a third threshold value or greater and a ratio of the quantum error rate in group units being a fourth threshold value or less is a fifth threshold value or greater, is satisfied.

To achieve the foregoing, an operating method of an eavesdropper detection apparatus according to an embodiment of the present disclosure includes: a bit error statistics operation of statistically compiling a quantum error rate in bit units between a transmitter and a receiver with respect to a photon for each bit in two or more bit groups into which a bit string to be transmitted is grouped by the same number of bits; a group error statistics operation of statistically compiling a quantum error rate in group units between the transmitter and the receiver with respect to the photon for each bit in the two or more bit groups; and an eavesdropper determination operation of determining whether an eavesdropper exists between the transmitter and the receiver, based on at least one of the quantum error rate in bit units or the quantum error rate in group units.

Specifically, for the two or more bit groups, a polarization basis configured for each bit group may be equally maintained during a transmission time, which is a time for transmitting all photons for each bit in each bit group.

Specifically, the transmission time may be a switching time required for the eavesdropper to change the polarization basis.

Specifically, at least one of the bit error statistics operation or the group error statistics operation may statistically compile a quantum error rate with respect to a photon for each bit in a bit group for which a polarization basis of the transmitter and a polarization basis of the receiver match among the two or more bit groups.

Specifically, the bit error statistics operation may statistically compile the quantum error rate in bit units according to a ratio of a number of bits of which bit values do not match between the transmitter and the receiver to a number of bits transmitted between the transmitter and the receiver.

Specifically, the group error statistics operation may statistically compile, for each bit group, the quantum error rate in group units according to a ratio of a number of bits of which bit values do not match between the transmitter and the receiver to a number of bits transmitted between the transmitter and the receiver.

Specifically, the eavesdropper determination operation may determine whether the eavesdropper exists, based on the quantum error rate in bit units, and verify at least one of misdetection of the eavesdropper or non-detection of the eavesdropper, based on the quantum error rate in group units, with respect to a result of determining whether the eavesdropper exists.

Specifically, when an importance of reducing the misdetection of the eavesdropper is a set value or greater, the eavesdropper determination operation may finally determine that the eavesdropper exists only in a case where a first determination condition that the quantum error rate in bit units is a first threshold value or greater, and a second determination condition that a ratio of the quantum error rate in group units being a second threshold value or greater is a third threshold value or greater and a ratio of the quantum error rate in group units being a fourth threshold value or less is a fifth threshold value or greater, are both satisfied.

Specifically, when an importance of reducing the non-detection of the eavesdropper is a set value or greater, the eavesdropper determination operation may finally determine that the eavesdropper exists only in a case where at least one of a first determination condition that the quantum error rate in bit units is a first threshold value or greater or a second determination condition that a ratio of the quantum error rate in group units being a second threshold value or greater is a third threshold value or greater and a ratio of the quantum error rate in group units being a fourth threshold value or less is a fifth threshold value or greater, is satisfied.

Accordingly, an eavesdropper detection apparatus and an operating method therefor according to the present disclosure may determine the existence of an eavesdropper by combining a quantum error rate in bit units and a quantum error rate in group units, which are statistically compiled when a polarization basis is maintained for each bit in a bit group into which a bit string to be transmitted is grouped by the same number of bits, thereby effectively detecting an eavesdropper existing between a transmitter and a receiver in bit transmission by a quantum key distribution scheme.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, exemplary embodiments of the present disclosure will be described with reference to the appended drawings.

An embodiment of the present disclosure covers a technology related to BB84 quantum cryptography protocol of a quantum key distribution scheme.

A transmitter of the existing BB84 protocol transmits information of '1' or '0' to a receiver using photons having a polarization characteristic.

Here, the photon refers to '1' or '0' depending on a polarization signal on a cross polarization (✥) or diagonal polarization (✕) basis, and which polarization signals respectively refer to '1' and '0' on each basis is disclosed through a general channel that can be eavesdropped on.

After transmitting and receiving all the photons, the transmitter discloses the bits transmitted by the transmitter and a polarization basis used to express each bit as a photon.

The receiver stores only a bit for which the same polarization basis as used by the transmitter is used among the bits received by the receiver as a statistic using this information.

When there is an eavesdropper during this process, 25% of the bits stochastically experience transmission/reception disagreement. Therefore, in the BB84 quantum cryptography protocol, when a bit disagreement of a specified threshold value or higher occurs, it is determined that an eavesdropper exists.

However, in the existing BB84 quantum cryptography protocol, it is difficult to set the threshold value of a quantum bit error rate (QBER) for determining an eavesdropper due to instability of a quantum channel or the like, and misdetection (where it is determined that there is an eavesdropper when there is no eavesdropper) and non-detection (where it is determined that there is no eavesdropper when there is an eavesdropper) of an eavesdropper may occur a plurality of times.

Accordingly, a method of reducing the threshold value of a quantum bit error rate may be considered in order to reduce non-detection of an eavesdropper. However, this method dramatically increases the misdetection rate of an eavesdropper, and thus application thereof is limited.

Therefore, an embodiment of the present disclosure proposes a new method for effectively detecting an eavesdropper existing between a transmitter and a receiver in bit transmission by a quantum key distribution scheme.

Figure 1:
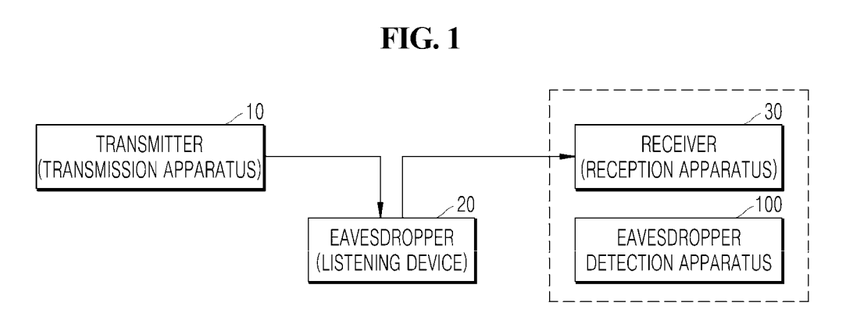
FIG. 1 illustrates a quantum communication-based eavesdropper detection environment according to an embodiment of the present disclosure.

FIG. 1 illustrates a quantum communication-based eavesdropper detection environment according to an embodiment of the present disclosure.

As illustrated in FIG. 1, the quantum communication-based eavesdropper detection environment according to an embodiment of the present disclosure may include an eavesdropper detection apparatus 100 for detecting an eavesdropper (listening device) 20 that may exist between a transmitter (transmission apparatus) 10 and a receiver (reception apparatus) 30, which transmit and receive a bit string using photons having a polarization characteristic.

The eavesdropper detection apparatus 100 refers to a device for determining the existence of the eavesdropper 20 by combining a quantum error rate in bit units and a quantum error rate in group units, which are statistically compiled when a polarization basis is maintained for each bit in a bit group into which a bit string to be transmitted is grouped by the same number of bits.

The eavesdropper detection apparatus 100 may be configured, for example, as an integrated component with the receiver 30 or as a separate component from the receiver 30 depending on a configuration method.

In an embodiment of the present disclosure, to support an operation of the eavesdropper detection apparatus 100 detecting the eavesdropper 20, a method may be applied in which a bit string to be transmitted may be transmitted and received between the transmitter 10 and the receiver 30 by grouping the bit string into two or more bit groups having the same number of bits (N), and the transmitter 10, the eavesdropper 20, and the receiver 30 maintain a polarization basis during a transmission time, which is a time for transmitting (transmitting and receiving) all photons corresponding to bits in one bit group.

Here, the number of bits (N) for grouping the bit groups may be determined according to a user purpose, and may be disclosed in advance before bit transmission and reception for quantum key distribution.

Further, the transmission time for transmitting (transmitting and receiving) all of the photons corresponding to the bits in the one bit group may be understood to correspond to a switching time (T) required for the eavesdropper to change the polarization basis.

Accordingly, the transmitter 10 may follow, as an example for maintaining the polarization basis in transmitting all of the photons corresponding to the bits in the one bit group, a method of calculating coefficients of transmitted photons and changing or maintaining a transmission polarization basis whenever transmitting N grouped photons.

The receiver 30 may follow, as an example for maintaining the polarization basis in receiving all of the photons corresponding to the bits in the one bit group, a method of changing or maintaining a reception polarization basis whenever receiving N grouped photons.

Since a polarization basis used by the transmitter 10 to transmit bits in each bit group is not disclosed in advance, polarization bases of the eavesdropper 20 and the receiver 30 are arbitrarily set for each group, and may or may not match the polarization basis of the transmitter 10.

When a polarization basis of the transmitter 10 and a polarization basis of the eavesdropper 20 match for a specific bit group, the eavesdropper 20 may accurately eavesdrop on bits in the group according to previously disclosed bit mapping for each polarization signal of the transmitter.

Therefore, when the polarization basis of the transmitter 10 and the polarization basis of the eavesdropper 20 match for the specific bit group, a bit interpreted by the eavesdropper 20 and a bit transmitted by the transmitter match with a probability of 100%.

However, when the polarization basis of the transmitter 10 and the polarization basis of the eavesdropper 20 do not match for the specific bit group, polarization signals of the transmitter 10 are arbitrarily reproduced through the polarization basis of the eavesdropper 20, and bits corresponding to the arbitrarily reproduced polarization signals are interpreted.

Therefore, when the polarization basis of the transmitter 10 and the polarization basis of the eavesdropper 20 do not match for the specific bit group, a bit interpreted by the eavesdropper 20 and a bit transmitted by the transmitter 10 do not match with a probability of 50%.

Here, the eavesdropper 20 generates a polarization signal for the bit interpreted by the eavesdropper 20 through the polarization basis set by the eavesdropper 20 and transmits a photon to the receiver 30. Similarly, when the polarization basis of the eavesdropper 20 and a polarization basis of the receiver 30 match for the specific group, a bit interpreted by the receiver 30 and the bit interpreted and then transmitted by the eavesdropper 20 match with a probability of 100%, and when the polarization bases do not match, the bit interpreted by the receiver 30 and the bit interpreted and then transmitted by the eavesdropper 20 do not match with a probability of 50%.

Figure 2:
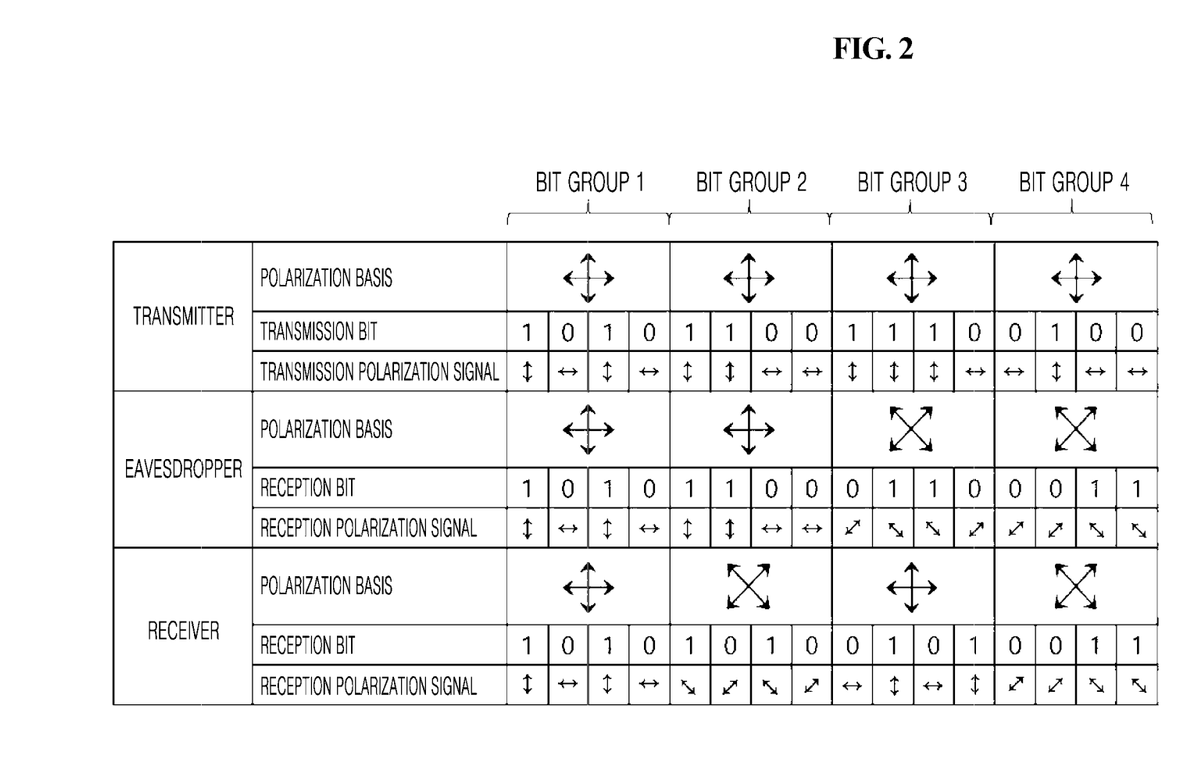
FIG. 2 illustrates an example of a quantum key distribution scheme according to an embodiment of the present disclosure.

For a better understanding of the description, it is assumed in FIG. 2 that the number of bits (N) for grouping is fixed to 4, a polarization signal ↕ is defined as 1 in a polarization basis of cross polarization, and a polarization signal ⤢ is defined as 1 in a polarization basis of diagonal polarization.

In bit group 1, since all polarization bases of the transmitter 10, the eavesdropper 20, and the receiver 30 match, no bit error occurs when a bit transmitted by the transmitter 10 is transferred to the receiver 30 via the eavesdropper 20.

In bit group 2, polarization bases of the transmitter 10 and the eavesdropper 20 match and thus the eavesdropper 20 can reproduce 100% of bits transmitted by the transmitter 10, while polarization bases of the eavesdropper 20 and the receiver 30 are different and thus a polarization signal of a photon transmitted by the eavesdropper 20 to the receiver 30 is detected as one arbitrary polarized light beam among diagonally polarized light beams of the receiver with a 50% probability through the polarization basis of the receiver 30.

Accordingly, bit disagreement occurs between the transmitter 10 and the receiver 30 with a 50% probability.

In bit group 3, polarization bases of the transmitter 10 and the eavesdropper 20 do not match and thus the eavesdropper 20 has an error in interpreting each bit transmitted by the transmitter 10 with a 50% probability, and polarization bases of the eavesdropper 20 and the receiver 30 also do not match and thus the receiver 30 has an error in interpreting each bit transmitted by the transmitter 10 with a 50% probability.

In the case of bit group 4, the receiver 30 has an error in interpreting each bit transmitted by the transmitter 10 with a 50% probability.

As described above, in the quantum communication-based eavesdropper detection environment according to an embodiment of the present disclosure, the existence of the eavesdropper 20 may be determined by combining a quantum error rate in bit units and a quantum error rate in group units, which are statistically compiled when a polarization basis is maintained for each bit in a bit group into which a bit string to be transmitted is grouped by the same number of bits, based on the foregoing configuration and the characteristic of maintaining a polarization basis for each bit group. Hereinafter, the configuration of the eavesdropper detection apparatus 100 for determining the existence of the eavesdropper 20 will be described in detail.

Figure 3:
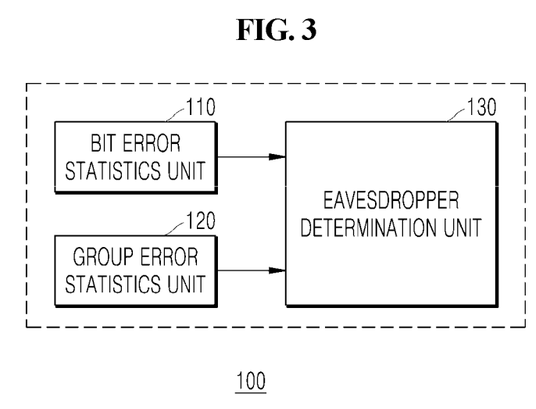
FIG. 3 is a block diagram illustrating the configuration of an eavesdropper detection apparatus according to an embodiment of the present disclosure.

FIG. 3 illustrates the schematic configuration of the eavesdropper detection apparatus 100 according to an embodiment of the present disclosure.

As illustrated in FIG. 3, the eavesdropper detection apparatus 100 according to the embodiment of the present disclosure may include a bit error statistics unit 110 for statistically compiling a quantum error rate in bit units, a group error statistics unit 120 for statistically compiling a quantum error rate in group units, and an eavesdropper determination unit 130 for determining whether the eavesdropper 20 exists between the transmitter 10 and the receiver 30.

All components or at least some components of the eavesdropper detection apparatus 100 including the bit error statistics unit 110, the group error statistics unit 120, and the eavesdropper determination unit 130 may be configured as a hardware module or a software module or may be configured as a combination of a hardware module and a software module.

Here, the software module may be understood as, for example, an instruction executed by a processor to control an operation in the eavesdropper detection apparatus 100, and the instruction may be mounted in a memory in the eavesdropper detection apparatus 100.

The eavesdropper detection apparatus 100 according to the embodiment of the present disclosure can effectively detect the eavesdropper 20 existing between the transmitter 10 and the receiver 30 using the foregoing configuration. Hereinafter, each component of the eavesdropper detection apparatus 100 for achieving the effective detection will be described in detail.

The bit error statistics unit 110 functions to statistically compile a quantum error rate in bit units.

Specifically, the bit error statistics unit 110 statistically compiles a quantum error rate in bit units between the transmitter 10 and the receiver 30 with respect to a photon for each bit in two or more bit groups into which a bit string to be transmitted is grouped by the same number of bits.

Here, the bit error statistics unit 110 may statistically compile a quantum error rate in bit units with respect to a photon for each bit in a bit group for which a polarization basis of the transmitter 10 and a polarization basis of the receiver 30 match among the two or more bit groups.

Referring to FIG. 2 described above, the bit error statistics unit 110 compiles statistics of a quantum error rate in bit units for bit group 1 and bit group 3, for which the polarization bases of the transmitter 10 and the receiver 30 are identified to match.

Accordingly, the bit error statistics unit 110 statistically compiles the quantum error rate in bit units with respect to the photon for each bit in the bit group for which the polarization bases of the transmitter 10 and the receiver 30 match according to the ratio of the number $C_{True, Diff}$ of bits of which the bit values do not match between the transmitter and the receiver to the number $C_{True}$ of bits transmitted between the transmitter 10 and the receiver 30.

According to an embodiment of the present disclosure, the quantum error rate in bit units which is statistically compiled may be represented, for example, by Equation 1.

$$\frac{C_{True,Diff}}{C_{True}} \qquad \text{Equations 1}$$

The group error statistics unit 120 functions to statistically compile a quantum error rate in group units.

Specifically, the group error statistics unit 120 statistically compiles a quantum error rate in group units between the transmitter 10 and the receiver 30 with respect to the photon for each bit in the two or more bit groups into which the bit string to be transmitted is grouped by the same number of bits.

Here, as in the bit error statistics unit 110, the group error statistics unit 120 may statistically compile a quantum error rate in group units with respect to the photon for each bit in the bit group for which the polarization basis of the transmitter 10 and the polarization basis of the receiver 30 match among the two or more bit groups.

That is, referring to FIG. 2 described above, the group error statistics unit 120 compiles statistics of a quantum error rate in group units for bit group 1 and bit group 3, for which the polarization bases of the transmitter 10 and the receiver 30 are identified to match.

Accordingly, the group error statistics unit 120 statistically compiles, for each bit group, the quantum error rate in group units with respect to the photon for each bit in the bit group for which the polarization bases of the transmitter 10 and the receiver 30 match according to the ratio of the number $C_{True,Diff}^{i}$ of bits of which the bit values do not match between the transmitter and the receiver to the number $N^i$ of bits transmitted between the transmitter 10 and the receiver 30.

According to an embodiment of the present disclosure, the quantum error rate in group units which is statistically compiled for an ith bit group may be represented, for example, by Equation 2.

$$\frac{C_{True,Diff}^{i}}{N^i} \qquad \text{Equation 2}$$

The eavesdropper determination unit 130 functions to determine whether the eavesdropper 20 exists between the transmitter 10 and the receiver 30.

Specifically, when statistically compiling the quantum error rate in bit units and the quantum error rate in group units is completed, the eavesdropper determining unit 130 combines the quantum error rate in bit units and the quantum error rate in group units, thereby determining whether the eavesdropper 20 exists between the transmitter 10 and the receiver 30.

Here, the eavesdropper determination unit 130 may determine whether the eavesdropper 20 exists, based on the quantum error rate in bit units, and may verify the result of determining whether the eavesdropper 20 exists, based on the quantum error rate in group units.

To this end, in an embodiment of the present disclosure, a first determination condition based on a first threshold value (Thr 1) and a second determination condition based on a second threshold value (Thr 2) to a fifth threshold value (Thr5), which may be set to various values in the quantum communication-based eavesdropper detection environment, may be defined, and the existence of the eavesdropper 20 may be determined based on the determination conditions according to the importance of misdetection of the eavesdroppers 20 and non-detection of the eavesdroppers 20.

When the importance of reducing misdetection of the eavesdropper 20 is a set value or greater, the eavesdropper determination unit 130 may finally determine that the eavesdropper 20 exists, for example, only in a case where the first determination condition that the quantum error rate in bit units is the first threshold value or greater, and the second determination condition that the ratio of the quantum error rate in group units being the second threshold value or greater is a third threshold value or greater and the ratio of the quantum error rate in group units being a fourth threshold value or less is the fifth threshold value or greater, are both satisfied.

When the importance of reducing non-detection of the eavesdropper 20 is a set value or greater, the eavesdropper determination unit 130 may finally determine that the eavesdropper 20 exists, for example, only in a case where at least one of the first determination condition that the quantum error rate in bit units is the first threshold value or greater or the second determination condition that the ratio of the quantum error rate in group units being the second threshold value or greater is a third threshold value or greater and the ratio of the quantum error rate in group units being a fourth threshold value or less is the fifth threshold value or greater, is satisfied.

In summary, in the embodiment of the present disclosure, when it is important to reduce misdetection of the eavesdropper 20, the determination condition for comparing the quantum error rate in bit units with the first threshold value (Thr 1) and the determination condition for comparing the quantum error rate in group units with the second threshold value (Thr 2) to the fifth threshold value (Thr 5) are combined as an AND condition, whereas when it is important to reduce non-detection of the eavesdropper 20, the determination condition for comparing the quantum error rate in bit units with the first threshold value (Thr 1) and the determination condition for comparing the quantum error rate in group units with the second threshold value (Thr 2) to the fifth threshold value (Thr 5) are combined as an OR condition, thus finally determining the existence of the eavesdropper 20 between the transmitter 10 and the receiver 30.

As described above, according to the configuration of the eavesdropper detection apparatus 20 according to the embodiment of the present disclosure, the existence of an eavesdropper may be determined by combining a quantum error rate in bit units and a quantum error rate in group units, which are statistically compiled when a polarization basis is maintained for each bit in a bit group into which a bit string to be transmitted is grouped by the same number of bits, thereby effectively reducing the misdetection rate and the non-detection rate of the eavesdropper 20.

Figure 4:
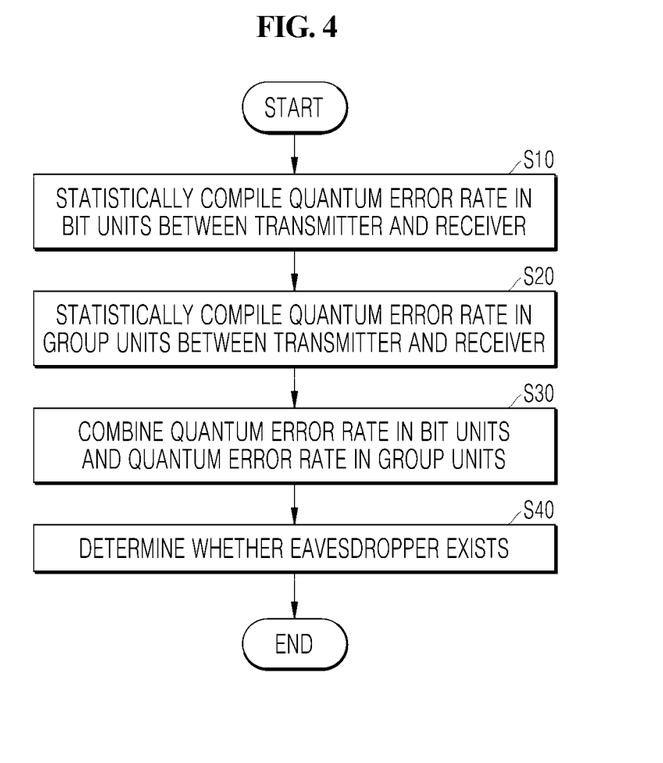
FIG. 4 to FIG. 6 are flowcharts illustrating an operating method of an eavesdropper detection apparatus according to an embodiment of the present disclosure.

Hereinafter, an operating method of the eavesdropper detection apparatus 100 according to an embodiment of the present disclosure will be described with reference to FIG. 4.

First, the bit error statistics unit 110 statistically compiles a quantum error rate in bit units between the transmitter 10 and the receiver 30 with respect to a photon for each bit in two or more bit groups into which a bit string to be transmitted is grouped by the same number of bits (S10).

Here, the bit error statistics unit 110 may statistically compile a quantum error rate in bit units with respect to a photon for each bit in a bit group for which a polarization basis of the transmitter 10 and a polarization basis of the receiver 30 match among the two or more bit groups.

Referring to FIG. 2 described above, the bit error statistics unit 110 compiles statistics of a quantum error rate in bit units for bit group 1 and bit group 3, for which the polarization bases of the transmitter 10 and the receiver 30 are identified to match.

Accordingly, the bit error statistics unit 110 statistically compiles the quantum error rate in bit units with respect to the photon for each bit in the bit group for which the polarization bases of the transmitter 10 and the receiver 30 match according to the ratio of the number $C_{True, Diff}$ of bits of which the bit values do not match between the transmitter and the receiver to the number $C_{True}$ of bits transmitted between the transmitter 10 and the receiver 30.

According to an embodiment of the present disclosure, the quantum error rate in bit units which is statistically compiled may be represented by Equation 1 illustrated above.

Subsequently, the group error statistics unit 120 statistically compiles a quantum error rate in group units between the transmitter 10 and the receiver 30 with respect to the photon for each bit in the two or more bit groups into which the bit string to be transmitted is grouped by the same number of bits (S30).

Here, as in the bit error statistics unit 110, the group error statistics unit 120 may statistically compile a quantum error rate in group units with respect to the photon for each bit in the bit group for which the polarization basis of the transmitter 10 and the polarization basis of the receiver 30 match among the two or more bit groups.

That is, referring to FIG. 2 described above, the group error statistics unit 120 compiles statistics of a quantum error rate in group units for bit group 1 and bit group 3, for which the polarization bases of the transmitter 10 and the receiver 30 are identified to match.

Accordingly, the group error statistics unit 120 statistically compiles, for each bit group, the quantum error rate in group units with respect to the photon for each bit in the bit group for which the polarization bases of the transmitter 10 and the receiver 30 match according to the ratio of the number $C_{True,Diff}^{i}$ of bits of which the bit values do not match between the transmitter and the receiver to the number $N^i$ of bits transmitted between the transmitter 10 and the receiver 30.

According to an embodiment of the present disclosure, the quantum error rate in group units which is statistically compiled for an ith bit group may be represented by Equation 2.

$$\frac{C_{True,Diff}^{i}}{N^i} \quad \text{Equation 2}$$

In the embodiment of the present disclosure, although operation S10 and operation S30 are described as being sequentially performed, the present disclosure is not limited thereto, and operation S10 and operation S30 may be simultaneously performed.

Next, when statistically compiling the quantum error rate in bit units and the quantum error rate in group units is completed, the eavesdropper determining unit 130 combines the quantum error rate in bit units and the quantum error rate in group units, thereby determining whether the eavesdropper 20 exists between the transmitter 10 and the receiver 30 (S40).

Here, the eavesdropper determination unit 130 may determine the nonexistence of the eavesdropper 20 or the existence of the eavesdropper 20, based on the quantum error rate in bit units, and may verify non-detection with respect to the result of determining the nonexistence of the eavesdropper 20 or may verify misdetection with respect to the result of determining the existence of the eavesdropper 20, based on the quantum error rate in group units.

To this end, in an embodiment of the present disclosure, a first determination condition based on a first threshold value (Thr 1) and a second determination condition based on a second threshold value (Thr 2) to a fifth threshold value (Thr 5), which may be set to various values in the quantum communication-based eavesdropper detection environment, may be defined, and the existence of the eavesdropper 20 may be determined based on the determination conditions according to the importance of misdetection of the eavesdroppers 20 and non-detection of the eavesdroppers 20.

When the importance of reducing misdetection of the eavesdropper 20 is a set value or greater, the eavesdropper determination unit 130 may finally determine that the eavesdropper 20 exists, for example, only in a case where the first determination condition that the quantum error rate in bit units is the first threshold value or greater, and the second determination condition that the ratio of the quantum error rate in group units being the second threshold value or greater is a third threshold value or greater and the ratio of the quantum error rate in group units being a fourth threshold value or less is the fifth threshold value or greater, are both satisfied.

Figure 5:
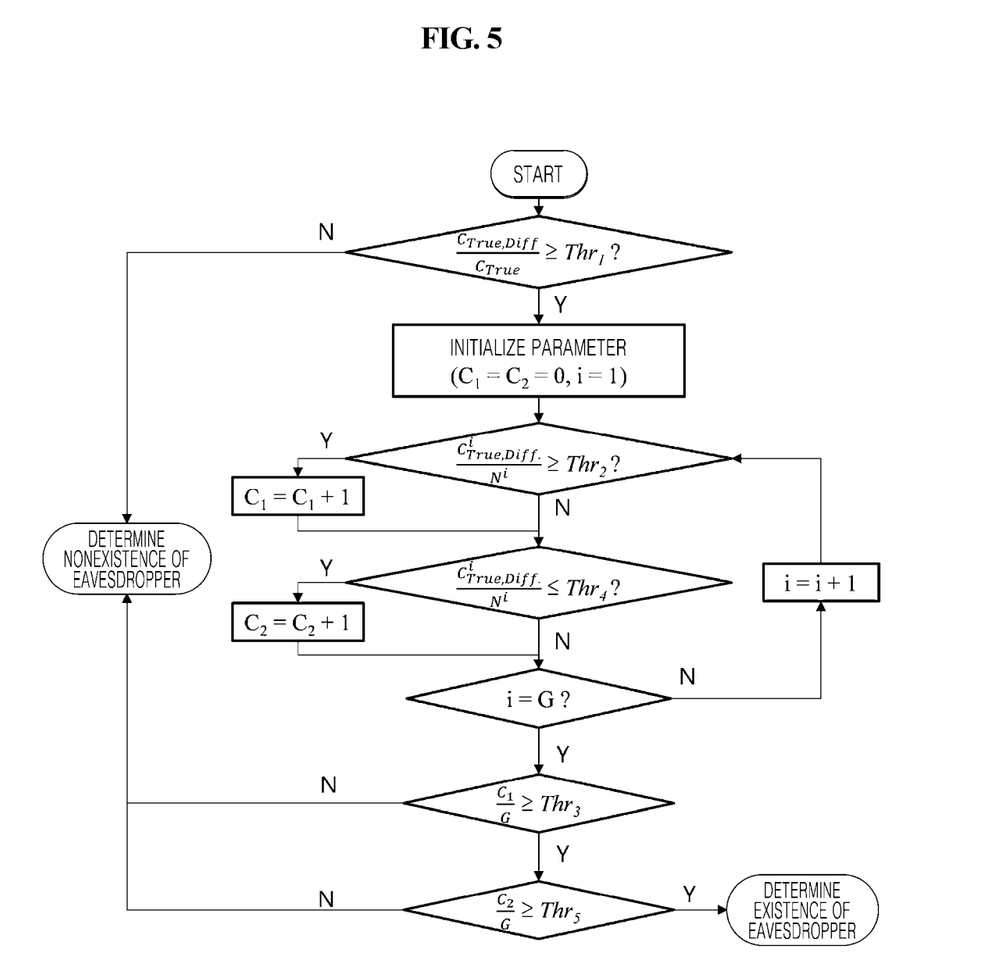

A specific example of the foregoing determination is described with reference to FIG. 5 as follows.

In a first conditional operation, it is determined whether the quantum error rate in bit units is less than or greater than the first threshold value (Thr 1), and when the quantum error rate in bit units is less than the first threshold value (Thr 1), it is determined that no eavesdropper 20 exists.

When the quantum error rate in bit units is equal to or greater than the first threshold value (Thr 1), parameters C1, C2, and i are initialized to 0, 0, and 1, respectively, for eavesdropping detection using the quantum error rate in group units.

In a second conditional operation, it is determined whether the quantum error rate of the ith bit group in group units is less than or greater than the second threshold (Thr 2), and when the quantum error rate of the ith bit group in group units is equal to or greater than the second threshold (Thr 2), parameter C1 is increased by 1. In a third conditional operation, it is determined whether the quantum error rate of the ith bit group in group units is less than or greater than the fourth threshold (Thr 4), and when the quantum error rate of the ith bit group in group units is less than or equal to the fourth threshold (Thr 4), parameter C2 is increased by 1.

This process is repeated as many times as the number (G) of bit groups whose polarization bases between transmitter and receiver match.

In a fifth conditional operation, when C1/G is less than the third threshold value (Thr 3), it is determined that no eavesdropper 20 exists, and when C1/G is the third threshold value (Thr 3) or greater and C2/G is the fifth threshold value (Thr 5) or greater, it is determined that the eavesdropper 20 exists.

Figure 6:
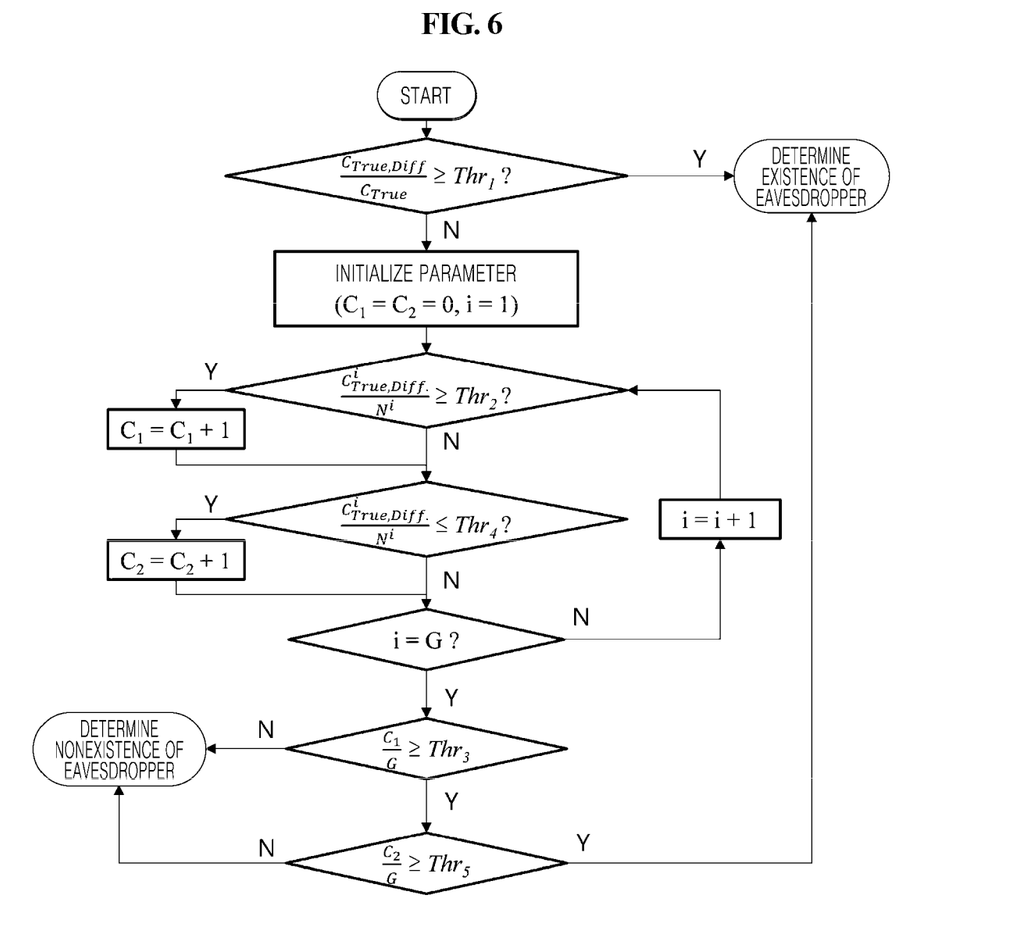

When the importance of reducing non-detection of the eavesdropper 20 is a set value or greater, the eavesdropper determination unit 130 may finally determine that the eavesdropper 20 exists, for example, only in a case where at least one of the first determination condition that the quantum error rate in bit units is the first threshold value or greater or the second determination condition that the ratio of the quantum error rate in group units being the second threshold value or greater is a third threshold value or greater and the ratio of the quantum error rate in group units being a fourth threshold value or less is the fifth threshold value or greater, is satisfied.

A specific example of the foregoing determination is described with reference to FIG. 6 as follows.

In a first conditional operation, it is determined whether the quantum error rate in bit units is less than or greater than the first threshold value (Thr 1), and when the quantum error rate in bit units is the first threshold value (Thr 1) or greater, it is determined that the eavesdropper 20 exists.

When the quantum error rate in bit units is less than the first threshold value (Thr 1), parameters C1, C2, and i are initialized to 0, 0, and 1, respectively, for eavesdropping detection using the quantum error rate in group units.

In a second conditional operation, it is determined whether the quantum error rate of the ith bit group in group units is less than or greater than the second threshold (Thr 2), and when the quantum error rate of the ith bit group in group units is equal to or greater than the second threshold (Thr 2), parameter C1 is increased by 1. In a third conditional operation, it is determined whether the quantum error rate of the ith bit group in group units is less than or greater than the fourth threshold (Thr 4), and when the quantum error rate of the ith bit group in group units is less than or equal to the fourth threshold (Thr 4), parameter C2 is increased by 1.

This process is repeated as many times as the number (G) of bit groups whose polarization bases between transmitter and receiver match.

In a fifth conditional operation, when C1/G is less than the third threshold value (Thr 3), it is determined that no eavesdropper 20 exists, and when C1/G is the third threshold value (Thr 3) or greater and C2/G is the fifth threshold value (Thr 5) or greater, it is determined that the eavesdropper 20 exists.

In summary, in the embodiment of the present disclosure, when it is important to reduce misdetection of the eavesdropper 20, the determination condition for comparing the quantum error rate in bit units with the first threshold value (Thr 1) and the determination condition for comparing the quantum error rate in group units with the second threshold value (Thr 2) to the fifth threshold value (Thr 5) are combined as an AND condition, whereas when it is important to reduce non-detection of the eavesdropper 20, the determination condition for comparing the quantum error rate in bit units with the first threshold value (Thr 1) and the determination condition for comparing the quantum error rate in group units with the second threshold value (Thr 2) to the fifth threshold value (Thr 5) are combined as an OR condition, thus finally determining the existence of the eavesdropper 20 between the transmitter 10 and the receiver 30.

As described above, according to the configuration of the eavesdropper detection apparatus 20 according to the embodiment of the present disclosure, the existence of an eavesdropper may be determined by combining a quantum error rate in bit units and a quantum error rate in group units, which are statistically compiled when a polarization basis is maintained for each bit in a bit group into which a bit string to be transmitted is grouped by the same number of bits, thereby effectively reducing the misdetection rate and the non-detection rate of the eavesdropper 20.

The implementations of the functional operations and subject matter described in the present disclosure may be implemented by a digital electronic circuit, and may be implemented in the form of computer software, firmware, or hardware including the structures disclosed in the present disclosure and structural equivalents thereof, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification are not intended to limit the present disclosure. Therefore, while the present disclosure was described in detail with reference to the above-mentioned examples, a person skilled in the art may modify, change, and transform some parts without departing from the scope of the present disclosure. The scope of the present disclosure is defined by the appended claims to be described below, rather than the detailed description. Accordingly, it will be appreciated that all modifications or variations derived from the meaning and scope of the appended claims and their equivalents are included in the range of the present disclosure.

What is claimed is:

1. An eavesdropper detection apparatus comprising:
a processor; and
memory storing instructions thereon, the instructions when executed by the processor cause the processor to:
determine a first quantum error rate representing a ratio of a number of mismatching bits in a bit string transmitted from a transmitter to a receiver and a number of bits in the bit string, the mismatching bits representing bits that do not match at the transmitter and the receiver, each of the bits represented by a photon and included in one of a plurality of bit groups, the bit string comprising the plurality of bit groups, each of the bit groups including a same number of bits and polarization basis at the transmitter and the receiver maintained for at least each of the bit group;
determine a second quantum error rate representing a ratio of a number of mismatching bits in each of the plurality of bit groups and a number of bits in each of the plurality of bit groups; and determine presence of an eavesdropper between the transmitter and the receiver, based on at least one of the first quantum error rate or the second quantum error rate.

2. The eavesdropper detection apparatus of claim 1, wherein the instructions further cause the processor to determine the second quantum error rate of a bit group for which a polarization basis of the transmitter and a polarization basis of the receiver match.

3. The eavesdropper detection apparatus of claim 2, wherein the instructions further cause the processor to determine whether the eavesdropper is present based on the first quantum error rate, and to verify at least one of misdetection of the eavesdropper or non-detection of the eavesdropper based on the second quantum error rate.

4. The eavesdropper detection apparatus of claim 3, wherein the instructions cause the processor to, when an importance of reducing the misdetection of the eavesdropper is a set value or greater, finally determine that the eavesdropper is present if both of a first determination condition and a second determination condition are satisfied,
wherein the first determination condition is that the first quantum error rate is a first threshold value or greater, and the second determination condition is that a ratio of the second quantum error rate being a second threshold value or greater is a third threshold value or greater and a ratio of the second quantum error rate being a fourth threshold value or less is a fifth threshold value or greater.

5. The eavesdropper detection apparatus of claim 3, wherein, the instructions cause the processor to, when an importance of reducing the non-detection of the eavesdropper is a set value or greater, finally determine that the eavesdropper is present if at least one of a first determination condition or a second determination condition is satisfied,
wherein the first determination condition is that the first quantum error rate is a first threshold value or greater, and the second determination condition is that a ratio of the second quantum error rate being a second threshold value or greater is a third threshold value or greater and a ratio of the second quantum error rate being a fourth threshold value or less is a fifth threshold value or greater.

6. An operating method of an eavesdropper detection apparatus, the operating method comprising:
determining a first quantum error rate representing a ratio of a number of mismatching bits in a bit string transmitted from a transmitter to a receiver and a number of bits in the bit string, the mismatching bits representing bits that do not match at the transmitter and the receiver, each of the bits represented by a photon and included in one of a plurality of bit groups, the bit string comprising the plurality of bit groups, each of the bit groups including a same number of bits and polarization basis at the transmitter and the receiver maintained for at least each of the bit group;
determining a second quantum error rate representing a ratio of a number of mismatching bits each of the plurality of bit groups and a number of bits in each of the plurality of bit groups; and
determining presence of an eavesdropper between the transmitter and the receiver, based on at least one of the first quantum error rate or the second quantum error rate.

7. The operating method of claim 6, wherein the second quantum error rate of a bit group for which a polarization basis of the transmitter and a polarization basis of the receiver match is determined.

8. The operating method of claim 7, wherein whether the eavesdropper is present is determined, based on the quantum error rate in bit units, and at least one of misdetection of the eavesdropper or non-detection of the eavesdropper is verified, based on the quantum error rate in group units.

9. The operating method of claim 8, wherein, when an importance of reducing the misdetection of the eavesdropper is a set value or greater, determining presence of an eavesdropper comprises finally determining that the eavesdropper exists in a case where both a first determination condition and a second determination condition is satisfied,
wherein the first determination condition is that the first quantum error rate is a first threshold value or greater, and the second determination condition is that a ratio of the second quantum error rate being a second threshold value or greater is a third threshold value or greater and a ratio of the second quantum error rate being a fourth threshold value or less is a fifth threshold value or greater.

10. The operating method of claim 8, wherein, when an importance of reducing the non-detection of the eavesdropper is a set value or greater, determining presence of an eavesdropper comprises finally determining that the eavesdropper exists only in a case where at least one of a first determination condition and a second determination condition is satisfied,
wherein the first determination condition is that the first quantum error rate is a first threshold value or greater, and the second determination condition is that a ratio of the second quantum error rate being a second threshold value or greater is a third threshold value or greater and a ratio of the second quantum error rate being a fourth threshold value or less is a fifth threshold value or greater.

* * * * *